Sept. 25, 1928.
A. G. MURDOCH
1,685,718
LEVER LINKWORK APPARATUS
Filed May 3, 1926   2 Sheets-Sheet 1
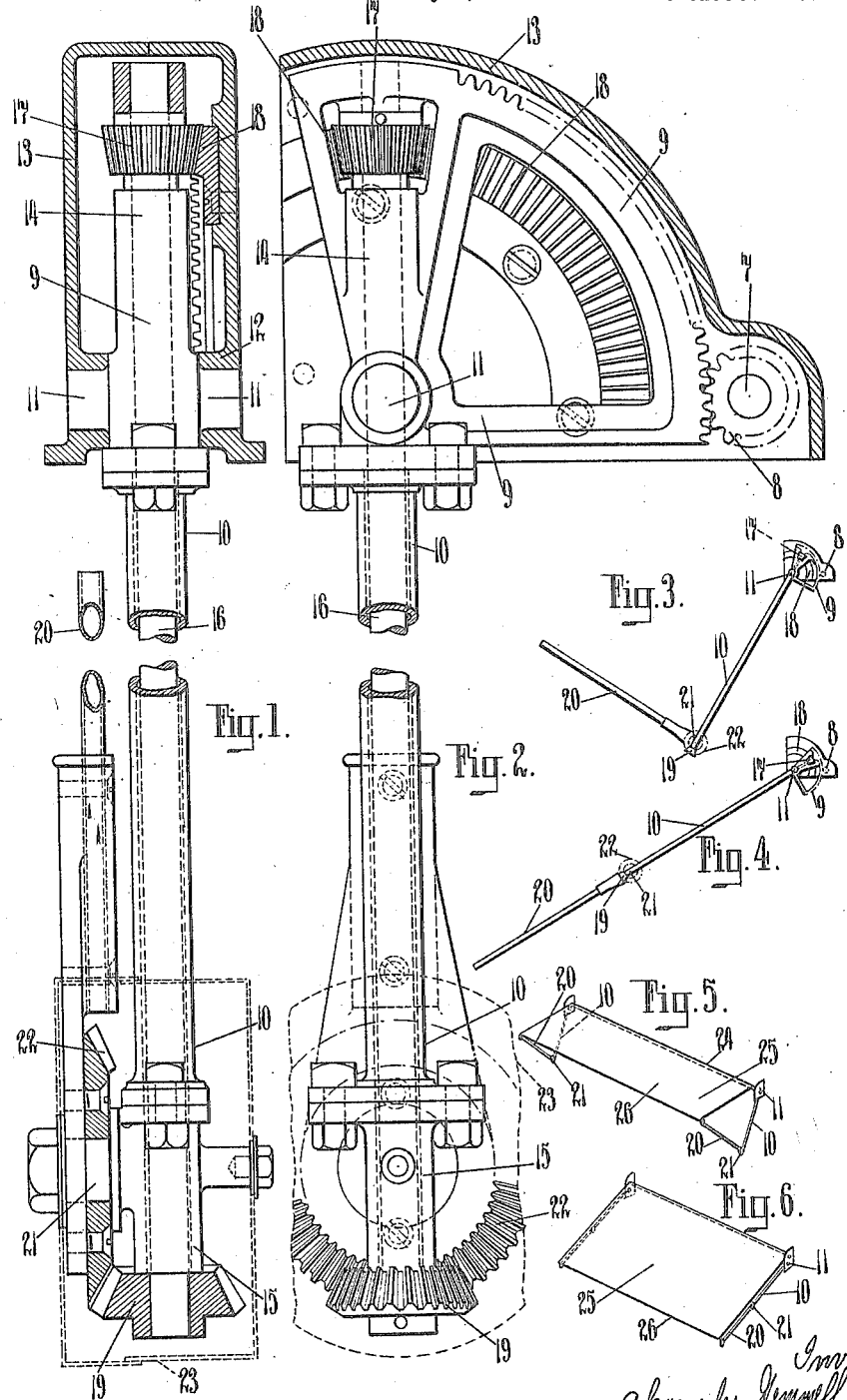

Sept. 25, 1928.
A. G. MURDOCH
1,685,718
LEVER LINKWORK APPARATUS
Filed May 3, 1926
2 Sheets-Sheet 2
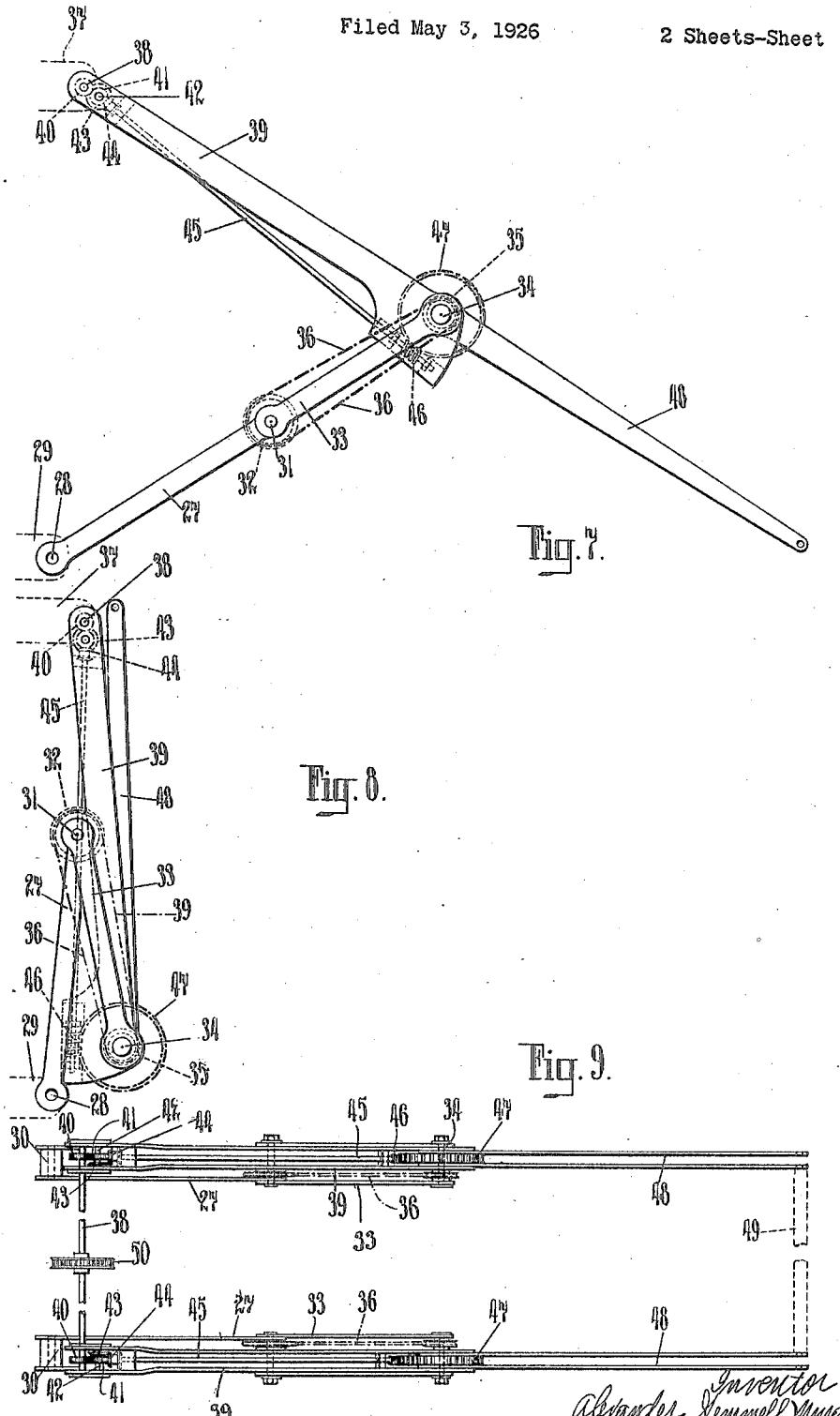

Patented Sept. 25, 1928.

1,685,718

UNITED STATES PATENT OFFICE.

ALEXANDER GEMMELL MURDOCH, OF LONDON, ENGLAND.

LEVER LINKWORK APPARATUS.

Application filed May 3, 1926, Serial No. 106,584, and in Great Britain May 7, 1925.

This invention relates to lever linkwork apparatus and has for its object to provide means by which a number of interconnected pivoted arms or the like can be caused to turn about their pivots to occupy various relative positions and form supports for suitable devices such for example as shop or other blinds, ships' boats and by which the blinds, boats or other devices may be brought into various positions when required, for example in the case of shop blinds, into the open or unrolled position, or into the closed or rolled up position.

It has for another object to pivot one or more of the interconnected pivoted arms to a fixed support and to provide driving means for causing, when required, movement of any one of the arms about its pivot, irrespective of whether this pivot co-operates with a fixed support or another arm or arms.

It has for a further object the provision of gearing and mechanism of any required description, for instance ordinary toothed gears, bevel gears, worm and worm wheel gears, sprocket and chain gears and shafts or any desired combination thereof by which the driving means is operated from any required and convenient position by power or otherwise and through any desired pivotal joints between the arms and for a still further object the location of interconnected gearing at the pivotal joints to cause the desired movements of the arms.

In order that the invention may be better understood it will now be described with reference to the accompanying drawings in which:—

Figs. 1 and 2 are fragmentary front and side elevations respectively with parts in section of jointed arms constructed according to one method of carrying the invention into effect, the lower part of Fig. 2 being taken from one side of Fig. 1 and the upper part from the other side.

Figs. 3 and 4 are diagrammatic side elevations of the jointed arms shown in Figs. 1 and 2 in two different positions to illustrate the action.

Figs. 5 and 6 are perspective diagrams showing arms constructed according to Figs. 1 to 4 as applied to the lowering and raising of blinds or shades for use in connection with shop fronts.

Fig. 7 shows in side elevation another method of carrying the invention into effect with the parts in one extreme position.

Fig. 8 is a similar view to Fig. 7 but with the parts in the other extreme position.

Fig. 9 is a plan of Fig. 7.

In the form of the invention shown in Figs. 1 to 6, the apparatus comprises a primary arm mounted to turn upon a suitable pivot or the like, means carried by the arm adapted to be rotated by the movements of the arm, and a secondary arm pivoted to the first mentioned arm, with gearing between the first and the second arms adapted to be operated by the previously mentioned means, to cause the second mentioned arm to be moved with respect to the first mentioned arm.

Referring more particularly to Figs. 1 to 4, a suitably supported and driven shaft 7 has mounted thereon a pinion 8 which meshes with a toothed quadrant 9 having attached thereto a hollow arm 10. The quadrant 9 is formed or provided with trunnions 11 mounted in bearings 12 in a casing 13 and has a bearing 14 with its axis substantially radial to the quadrant and in axial alignment with the arm 10, which at the other end carries another bearing 15. A shaft 16 is mounted in the bearings 14 and 15 and extends freely through the arm 10. 17 is a bevelled pinion fixedly mounted towards one end of the shaft 16 and extending through a gap in the quadrant 9. This pinion 17 meshes with a bevelled toothed quadrant 18 fixed to the casing 13.

Another bevelled pinion 19 is fixed to the other end of the shaft 16 and 20 is a secondary arm pivotally mounted at 21 to the bearing 15 and having fixed thereto a bevelled toothed wheel 22 concentric with the pivot. The pinion 19 meshes with this wheel 22 and if desired the gearing may be enclosed in suitable casing as shown at 23, to render the gear weatherproof, such casing if necessary being made in sections to allow for relative movement of the parts.

The action of the mechanism will be readily understood; assuming the parts to be in the position shown in Fig. 2, by rotating the pinion in a counter-clockwise direction the quadrant 9 will move in a clockwise direction and carry with it the arm 10 for instance to the position shown in Fig. 3. At the same time however the bevelled pinion 17 rolls on the fixed bevelled quadrant 18 and rotates the shaft 16. This rotates the bevelled pinion 19 which is in mesh with the bevelled wheel 22 and consequently this wheel 22 is caused to move about the pivot 21. As the secondary arm 20 is fixed to the wheel 22, this arm 20 is caused to move about the pivot 21 and relatively to the arm 10 so that it comes into the position shown in Fig. 3. By continuing the action the arms 10 and 20 are brought into the position shown in Fig. 4.

Figs. 5 and 6 show diagrammatically in two positions an application of the form of the invention shown in Figs. 1 to 4 for raising and lowering a shop blind; in these figures 24 is the spring roller blind mounted and supported in position in any usual and known manner. The outer end of the blind 25 is connected in a desired manner to a front member or lath 26 which may be of stiffened section and the extremities of the member 26 are connected by readily detachable joints with the outer ends of the secondary arms 20 of two pair of jointed arms constructed as previously described. When the blind is rolled up, the secondary arms 20 come at the inner sides of the arms 10 as shown in Fig. 1, and when turned completely down the blind occupies the position shown in Fig. 6, intermediate position being shown in Fig. 5. The positions of the arms shown in Figs. 3 and 4 correspond to the positions shown in Figs. 5 and 6.

The shaft 7 may be common to both pinions 8 for the mechanism shown in Figs. 5 and 6 and be actuated by hand, by a motor or other mechanical means, in order to lower or raise the blind as and when required.

In the particular form of mechanism shown in Figs. 1 and 2, the arms 10 are formed hollow with the shafts 16 running therethrough, but in some cases the shafts may come on the exterior and be supported in suitable bearings.

In some instances, in the case of small blinds or shades, a single device or apparatus of the kind just described may be provided attached to the middle of the window frame and to the middle of the transverse rod or lath of the outer edge of the blind and in this case the arm 10 would point vertically upwards when the blind was rolled up, and turn down to effect unrolling.

By suitable selection of the various gears with relation to one another, the outer end of the secondary arm may be projected and withdrawn in a desired path, which may be straight or otherwise, the general path being that of a modified cycloid.

The apparatus may be arranged to operate vertically up or down or horizontally to suit particular requirements.

In some instances a third pivoted arm may be provided connected to the secondary arm, and this third arm may be moved with respect to the second arm through suitable transmitting mechanism operated by the movement of the second arm. For this purpose at the end of the primary arm a suitable gear must be fixed with which a gear carried by the second arm can engage, the said gear transmitting in a similar manner to that already described with regard to the primary arm, movement from the secondary to the third arm. This process might be extended to any desirable number of arms, and the arms may be arranged to move in any desired directions relatively to one another and not necessarily in the same plane or in planes parallel to one another.

As a modification of the construction first described, the pinion on the driving shaft in addition to gearing with the toothed quadrant might gear with a wheel rotating about a fixed pivotal axis, which wheel in turn meshes with a toothed wheel freely rotatable upon the pivotal axis of the primary arm. This latter wheel would be furnished with bevel gearing or its equivalent meshing with corresponding bevel gearing or its equivalent on the shaft extending up the arm.

As a further alternative, the driving spindle might be provided with a sprocket wheel co-operating by means of a chain with another sprocket wheel mounted upon a spindle having another gear wheel thereon meshing with a gear wheel on the pivot of the arm and this gear wheel has connected therewith another sprocket wheel co-operating by means of a chain with another sprocket wheel on the pivot between the primary and secondary arms the proportions of the wheels being chosen to give desired movements.

In the form of the invention shown in Figs. 7, 8 and 9, the apparatus comprises toggle links, the extremity of one arm of which is adapted to move about a fixed axis and having means at the elbow or pivoted joint between the arms of the toggle for causing the said toggle to be closed or opened, that is for the arms to lie beside each other or for the outer arm to move a desired angular extent from the arm turning on the fixed axis. The outer end of the outer arm is in pivotal engagement with another pivoted arm previously termed the primary arm at or towards the free extremity of this other arm. The pivotal axis of this primary arm is fixed and comes at a desired distance from the fixed axis of the toggle arm. As a result when the toggle is in the closed position and the means for causing the arms of the toggle to open are operated then the connection of the free end of the toggle with the primary arm causes the primary arm to be moved on its pivot. Similarly when the toggle is caused to close, then the primary arm is given a reverse movement. The primary arm may carry a secondary arm in pivotal relation with the free end thereof and preferably on the same pivotal axis as the free end of the toggle, which secondary arm is caused to move on its pivot when the primary arm moves. This pivotal movement of the secondary arm may be effected by the means which causes the opening and closing of the toggle or by the movement of the primary arm about its pivot and in both cases be transmitted by suitable gearing and/or mechanism.

In the drawing Figs. 7 and 8 show the lever linkwork according to this form of the invention suitable for supporting one side of a shopblind, whilst in plan, two associated and similar mechanisms are shown with a common drive. In these views 27 is an inner toggle arm having its lower end pivoted at 28 to a fixed pivot carried in a suitable position and by suitable fixed means 29, for example by a column between two windows of the shop. This toggle arm 27 may as shown comprise two similar strips held apart by a distance sleeve 30 at the pivot. At the other end these strips have a pivot pin 31 on which a sprocket wheel 32 of desired diameter is mounted such sprocket wheel being fixed to the strips of the arm 27 and coming therebetween. The outer arm 33 of the toggle is also formed by two strips the free ends of which come over projecting portions of the pivot pin 31 on which the sprocket wheel 32 is mounted and on the outside of the strips of the arm 27 before referred to. The other end of the strips of the outer arm 33 are mounted on a long pivot pin 34 which can turn therein and another sprocket wheel 35 of suitable size is keyed on the pin 34 centrally between the strips of the arm 33, suitable washers or sleeves also being included as distance pieces if required. This sprocket wheel 35 is not fixed to the strips of the arm 33 but is free to be turned therein by the long pivot pin 34. An endless driving chain 36 connects the two sprocket wheels 32 and 35.

At a desired distance above the fixed axis 28 of the inner arm 27 of the toggle and mounted in bearings supported by a fixed part 37 a driving shaft 38 extends parallel to the said fixed axis for the apertured end of a primary arm 39 formed from two strips spaced apart and with bent out ends, which are adapted to turn freely on the shaft 38. These strips are of desired length and at the other end are apertured or carry apertured parts, which are mounted on the long pivot pin 34 before referred to and on one side of the outer toggle arm 33.

The driving shaft 38 has mounted thereon inside the formed end of the primary arm 39 a toothed pinion 40 which meshes with another pinion 41 on a counter shaft 42 mounted between the two strips of the primary arm 39 and movable therewith. On this counter shaft is also mounted a bevel pinion 43 meshing with another bevel pinion 44 on the end of a shaft 45 extending longitudinally with respect to and between the two strips of the primary arm 39. This shaft 45 is mounted in bearings between the strips and towards the other end carries a small worm 46. This gears with a comparatively large worm wheel 47 keyed to the long pivot pin 34 before referred to and coming between the strips of the primary arm or parts carried thereby.

In some cases instead of the worm being mounted on the shaft extending between the strips of the primary arm this may be replaced by a bevel gear meshing with another bevel gear on a counter shaft suitably supported between the strips of the primary arm or parts carried thereby and this counter shaft may have the worm mounted thereon.

A secondary arm 48 also formed from two strips spaced apart by distance pieces is mounted upon the long pivot pin 34, so that one strip or a part carried thereby comes on each side of the worm wheel 47 to which it is fixed and between the worm wheel 47 and the strip of the primary arm 39. The outer end of the secondary arm 48 is suitably attached to one end of the lath or beam 49 to carry the outer end of the blind.

When the parts are in the closed position (Fig. 8) the primary arm 39 projects downwardly and comes beneath the inner arm 27 of the toggle which projects upwardly the outer toggle arm 33 projects downwardly coming at a small angle to the inner toggle arm 27 and the secondary arm 48 projects upwardly. To move the parts to the open position (Figs. 7 and 9) the driving shaft 38 is driven for instance by an electric motor, through a suitable worm and the worm wheel 50, by hand or otherwise. This causes the shaft 45 in between the strips of the primary arm 39 to be driven through the pinions 40 and 41 and bevel gearing 43, 44 in the forked end of the arm. The shaft 45 between the primary arm strips drives the large worm wheel 47 through the worm 46 and if present in the construction the other bevel gears. The worm wheel 47 carries the long pivot pin 34 round with it. As the other sprocket wheel 32 is fixed to the inner arm 27 of the toggle this sprocket 32 cannot rotate but the movement of the turning sprocket 35 pulls the chain 36 on to it on one side and lets it off on the other. This changing of the position of the chain 36 on one sprocket causes a corresponding but opposite changing in position of the chain on the fixed sprocket 32, that is to say the contacting part of the chain 36 on the fixed sprocket 32 changes although the angle of contact remains the same. As a consequence the outer arm 33 of the toggle is gradually turned on the pivot 31 at the elbow or middle point between the toggle arms until these arms come in line or pass the dead point or occupy any other desired angular position.

While this has been taking place the free end of the outer toggle arm 33 which is pivoted to the primary arm 39 has been moved from its original position carrying with it the primary arm which moves about its pivot 38 and a final position is reached where the primary arm is raised say through an angle of about 45° to 60° and the toggle forms a stay or strut thereto, see Fig. 7.

The movement of the worm wheel 47 also effects the movement of the secondary arm 48 which is fixed thereto and consequently turns therewith and at the end of the opening action the secondary arm 48 has been turned through about 180° and forms a continuation of the primary arm 39; the gearing and dimensions of the parts are so chosen that the toggle reaches the end of its movement at the same time as the secondary arm.

The blind lath or beam 49 as before explained has a similar linkwork at each side and these may be driven simultaneously by the same driving shaft or/and by the same motive power so that each mechanism opens or closes simultaneously and in the same phase, Fig. 9. The blind lath or beam 49 is then drawn down from both ends evenly, bringing the blind with it, the blind being drawn from off the usual spring roller which is housed in the usual compartment at the top of the window or facia (not shown on the drawing).

In the case of very heavy blinds in place of a toggle stay coming to one side only of the primary arm a toggle stay with associated sprocket wheels and chains could come on each side of the primary arm.

Where an electric motor or motors are used to effect the lowering and raising of one or more shop blinds fitted with apparatus for transmitting motion and linkwork according to the invention these may be controlled by any form of switch which may be a time switch and/or a switch operated by changes in the intensity of light. By this latter the blinds would be drawn out or lowered automatically when the light was too bright, for instance when the sun shone on a window and again raised when the light became less intense for instance at sunset.

Although toggle and other arms have been described as formed from two parallel strips they may be of other construction, for example of channel, box, or hollow cylindrical section, and the hollow interior may serve for the passage of shafts.

Where required the arms, gearing or other parts may be cased in, the casings permitting the necessary movements and acting as protectors.

In cases where the movement of the primary arm around its centre is utilized to transmit movement to the secondary arm this may be effected by a fixed toothed quadrant bevel or otherwise or the like concentric with the axis of movement of the primary arm, with which quadrant a gear, bevel or otherwise engages the said gear transmitting its movements by a shaft or otherwise to other gearing between the primary and secondary arms for the purpose.

The gearing for operating the toggle arms may be driven in any other suitable manner for example from a driving shaft at the fixed axis around which the primary arm moves or the fixed axis around which one arm of the toggle moves, the movements of the shaft being transmitted through any suitable mechanism and gearing preferably reduction gearing, which may include ordinary toothed gears, bevel gears, shafts, worm and worm wheel gears, sprocket wheels and chains. In some cases a prime mover, such as an electric motor, may be carried by any of the arms, toggle, primary, secondary or otherwise and by suitable gearing, preferably including parts as previously described to effect the operation. The driving means may have combined therewith means for stopping the drive when extreme positions are reached and also automatic reversing means for reversing the drive upon the next operation.

Another useful application of the apparatus previously described is to take the place of the davits usually employed on board ship for lowering and raising lifeboats, in which case two of the apparatus will of course be employed and they might be designed either to swing out and lower the boat, or simply to swing it out, the lowering being partly or entirely effected by independent means.

Another useful application of the invention is for operating trellis or Bostwick gates, in which case one or more of the apparatus may be fitted to each gate.

Many other applications of the principles of the invention may also be suggested, where it is required to convert a rotary or oscillatory movement about a centre into a movement in a straight or curved path.

In some instances two of the apparatus may be mounted with the joints between the primary and secondary arms facing one another, that is to say directed towards one another, in which instance a member connected to the extremities of the secondary arms may be caused to move constantly parallel to itself.

What I claim and desire to secure by Letters Patent of the United States of America is:—

1. In a roller awning construction, a lever linkwork apparatus comprising a primary arm mounted to turn on a suitable support, means for turning the primary arm about its pivot, means for supporting the primary arm in any adjusted position, a secondary arm pivoted to the primary arm at a desired distance from the pivot thereof, cooperative gearing arranged at the pivotal connection between, and operatively connected to, the primary and secondary arms, and means for actuating the said gearing to cause the secondary arm to move about its pivotal connection with the primary arm for the purposes set forth.

2. In a roller awning construction, a lever linkwork apparatus comprising a primary arm mounted to turn on a suitable support, means for turning the primary arm about its pivot, toggle links, the extremity of one link of which is adapted to move about a fixed axis, the free end of the other toggle link being pivoted to the primary arm a desired distance from the pivot thereof, a secondary arm pivoted to the primary arm on the same pivotal axis as the toggle link connection, cooperative gearing located at the pivotal connection between and operatively connected to, the primary and secondary arms, means for actuating the said gearing to cause the secondary arm to move about its pivotal connection with the primary arm, and means for causing the toggle links to be closed or opened synchronously with the movements of the secondary arm about its pivot for the purposes set forth.

3. In a roller awning construction, a lever linkwork apparatus comprising a primary arm mounted to turn on a suitable support, means for turning the primary arm about its pivot, toggle links, the extremity of one link of which is adapted to move about a fixed axis, the free end of the other toggle link being pivoted to the primary arm a desired distance from the pivot thereof, a secondary arm pivoted to the primary arm on the same pivotal axis as the toggle link connection, cooperative gearing located at the pivotal connection between and operatively connected to, the primary and secondary arms, means for actuating the said gearing to cause both the secondary arm to move about its pivotal connection with the primary arm and the toggle links to be closed or opened synchronously with such movement for the purposes set forth.

4. In a roller awning construction, a lever linkwork apparatus comprising a primary arm mounted to turn on a suitable support, means for turning the primary arm about its pivot, toggle links, the extremity of one link of which is adapted to move about a fixed axis, the free end of the other toggle link being pivoted to the primary arm a desired distance from the pivot thereof, a secondary arm pivoted to the primary arm on the same pivotal axis as the toggle link connection, cooperative gearing located at the pivotal connection between and operatively connected to the primary and secondary arms, means for actuating the said gearing to cause the secondary arm to move about its pivotal connection with the primary arm, and gearing located at the pivotal joint between the toggle links and cooperatively connected to the gearing at the pivotal joint between the primary and secondary arms, all for the purposes set forth.

5. In a roller awning construction, a lever linkwork apparatus comprising a primary arm mounted to turn on a suitable support, means for turning the primary arm about its pivot, toggle links, the extremity of one link of which is adapted to move about a fixed axis, the free end of the other toggle link being pivoted to the primary arm a desired distance from the pivot thereof, a secondary arm pivoted to the primary arm on the same pivotal axis as the toggle link connection, cooperative gearing located at the pivotal connection between and operatively connected to, the primary and secondary arms, a suitably supported and carried driving shaft for actuating the said gearing to cause the secondary arm to move about its pivotal connection with the primary arm, and means for causing the toggle links to be closed or opened synchronously with the movements of the secondary arm about its pivot for the purposes set forth.

6. In a roller awning construction, a lever linkwork apparatus comprising a primary arm mounted to turn on a suitable support, means for turning the primary arm about its pivot, toggle links, the extremity of one link of which is adapted to move about a fixed axis, the free end of the other toggle link being pivoted to the primary arm a desired distance from the pivot thereof, a secondary arm pivoted to the primary arm on the same pivotal axis as the toggle link connection, cooperative gearing located at the pivotal connection between and operatively connected to, the primary and secondary arms, a driving shaft carried by the primary arm for actuating said gearing, other gearing means operatively connecting the shaft to the exterior driving means, to cause the secondary arm to move about its pivotal connection with the primary arm, and means for causing the toggle links to be closed or opened synchronously with the movements of the secondary arm about its pivot for the purposes set forth.

7. In a roller awning construction, a lever linkwork apparatus comprising a primary arm mounted to turn on a suitable support, means for turning the primary arm about its pivot, means for supporting the primary arm in any adjusted position, a secondary arm pivoted to the primary arm at a desired distance from the pivot thereof, cooperative gearing located at the pivotal connection between, and operatively connected to, the primary and secondary arms, and means carried by the primary arm adapted to be rotated by the movements of the arm for actuating the said gearing to cause the secondary arm to move about its pivotal connection with the primary arm for the purposes set forth.

8. In a roller awning construction, a lever linkwork apparatus comprising a primary arm mounted to turn on a suitable support, means for turning the primary arm about its pivot, means for supporting the primary arm in any adjusted position, a secondary arm pivoted to the primary arm at a desired distance from the pivot thereof, cooperative gearing located at the pivotal connection between, and cooperatively connected to, the primary and secondary arms, means for actuating the said gearing to cause the secondary arm to move about its pivotal connection with the primary arm, a third arm pivotally connected to the secondary arm, and gearing between the second and third arms adapted to be operated by the previously mentioned gear-operating means to cause the third mentioned arm to be moved with respect to the second mentioned arm for the purposes set forth.

9. In a roller awning construction, a lever linkwork apparatus comprising a primary arm mounted to turn on a suitable support, means for turning the primary arm about its pivot, toggle links, the extremity of one link of which is adapted to move about a fixed axis, the free end of the other toggle link being pivoted to the primary arm a desired distance from the pivot thereof, a secondary arm pivoted to the primary arm on the same pivotal axis as the toggle link connection, cooperative gearing including a sprocket wheel located at the pivotal connection between and operatively connected to the primary and secondary arms, a suitably supported and carried driving shaft for actuating the said gearing to cause the secondary arm to move about its pivotal connection with the primary arm, gearing including a sprocket wheel located at the pivotal joint between the toggle links, and a driving chain connecting the sprocket at the pivotal joint between the primary and secondary arms and the sprocket at the elbow joint between the toggle links, all for the purposes set forth.

10. In a roller awning construction, a lever linkwork apparatus comprising a primary arm mounted to turn on a suitable support, means for turning the primary arm about its pivot, toggle links, the extremity of one link of which is adapted to move about a fixed axis, the free end of the other toggle link being pivoted to the primary arm a desired distance from the pivot thereof, a secondary arm pivoted to the primary arm on the same pivotal axis as the toggle link connection, cooperative gearing including a sprocket wheel and a worm wheel located at the pivotal connection between and operatively connected to the primary and secondary arms, a suitably supported and carried driving shaft, a worm mounted on the shaft and engaging with the said worm wheel to cause the secondary arm to move about its pivotal connection with the primary arm, gearing including a sprocket wheel located at the pivotal joint between the toggle links, and a driving chain connecting the sprocket at the pivotal joint between the primary and secondary arms and the sprocket at the elbow joint between the toggle links all for the purposes set forth.

11. Apparatus of the class described, comprising an arm having a primary member and a secondary member pivotally connected together, a supporting pivot for the upper end of the primary arm, a toggle jointed strut having a supporting pivot at its lower end and connected at its upper end to the pivot between said primary and secondary members, means to raise and lower said arm and fold and unfold the primary and secondary members thereof and means to bend or straighten the strut, said bending and straightening means of the strut being connected to and actuated by the means for raising and lowering and folding and unfolding the primary and secondary members of said arm.

12. Apparatus comprising a pair of the arms and struts as claimed in claim 11, and including a common power shaft connecting the means for operating said arms.

13. Apparatus comprising a pair of the arms and struts as claimed in claim 11, including also a supporting member for a blind or the like connecting the outer ends of the secondary members.

In witness whereof I affix my signature.

ALEXANDER GEMMELL MURDOCH.